Jan. 14, 1936.  R. O. HELGEBY  2,027,589
POINTER TYPE SPEEDOMETER
Filed Sept. 17, 1928  3 Sheets-Sheet 1

Inventor
Ralph O. Helgeby
By Blackmare Spencer & Flint
Attorneys

Jan. 14, 1936.        R. O. HELGEBY        2,027,589
POINTER TYPE SPEEDOMETER
Filed Sept. 17, 1928        3 Sheets-Sheet 2

Inventor
Ralph O. Helgeby
By Blackmore Spencer & Hunt
Attorneys

Jan. 14, 1936.   R. O. HELGEBY   2,027,589
POINTER TYPE SPEEDOMETER
Filed Sept. 17, 1928   3 Sheets-Sheet 3

Inventor
Ralph O. Helgeby
By Blackmore Spencer Flint
Attorney

Patented Jan. 14, 1936

2,027,589

UNITED STATES PATENT OFFICE 2,027,589

POINTER TYPE SPEEDOMETER

Ralph O. Helgeby, Flint, Mich., assignor, by mesne assignments, to General Motors Corporation, Detroit, Mich., a corporation of Delaware Application September 17, 1928, Serial No. 306,369

2 Claims. (Cl. 264—13)

This invention relates to measuring instruments and has been designed as an improvement in a combined speedometer and odometer for use particularly on vehicles to measure speed and the distance travelled.

An object of the invention is to provide a simple form of speedometer of the pointer type, and one economical to manufacture and easy to assemble. Other objects and advantages will be apparent from the following description.

Figure 1:
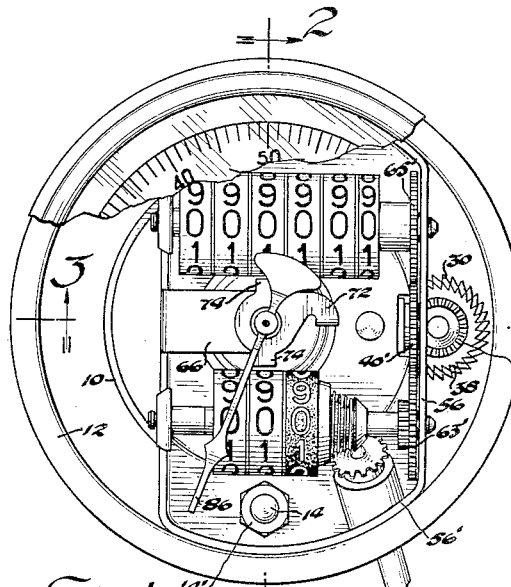
Figure 1 is a front elevation with parts broken away.

Referring to the drawing, there is illustrated a complete speedometer unit in which a pointer type of speedometer is combined with an odometer employing internal gear transfer mechanism and a double reduction ratchet drive.

In the drawing, numeral 10 represents a main supporting frame. It is intended that this frame shall be made by the process of die casting. As is customary, this frame is to be placed within a casing 12. Studs 14 are used to secure the frame in the casing. These studs extend from the frame and through the casing, suitable nuts 14' being threaded on the studs to clamp the casing and frame together.

The frame is formed with a shank 10' in which is a suitable bore for a rotor shaft 16. The bore serves as a shaft bearing. A disc-like retainer 18 is passed through an opening in shank 10' and enters a groove in shaft 16. When the casing is assembled upon the frame its flange 12' serves, as clearly shown in Figure 2, to hold the retainer 18 in position. A bushing 20, its end formed as an eccentric 22, is pressed upon rotor shaft 16. To the end of rotor shaft 16 is fixed a disc-shaped rotor 24 by riveting over the ends of the shaft as at 24'.

The rotor shaft is driven by a speedometer cable, as usual. At 17' is shown a flexible drive cable, its tip 17 being of the key type and received in a radial slot of the rotor shaft. The flexible cable 17' is enclosed in a housing 17''. Engaged with the flange on the end of the housing is a coupling 19, which is threaded to the shank 10' to hold the housing in assembled relation with the shank and the drive cable tip with the rotor shaft.

Figure 2:
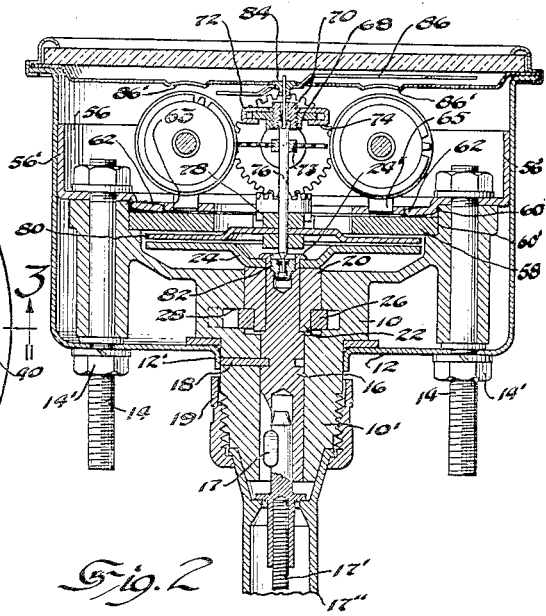
Figure 2 is a transverse section on line 2—2 of Figure 1.
Figure 5:
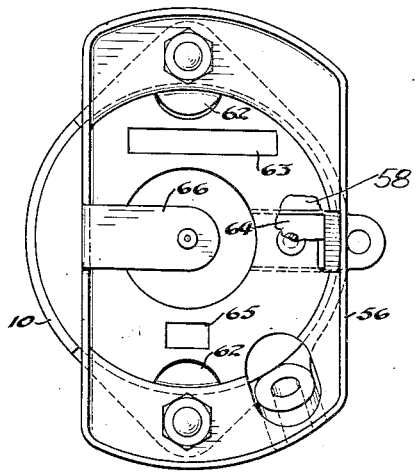
Figure 5 is a view in front elevation of the odometer supporting frame.
Figure 6:
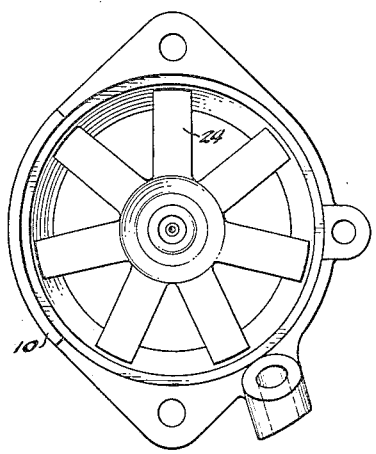
Figure 6 is a view in front elevation of the main frame having the rotor in place.
Figure 7:
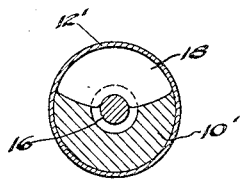
Figure 7 is a section on line 7—7 of Figure 3.
Figure 8:
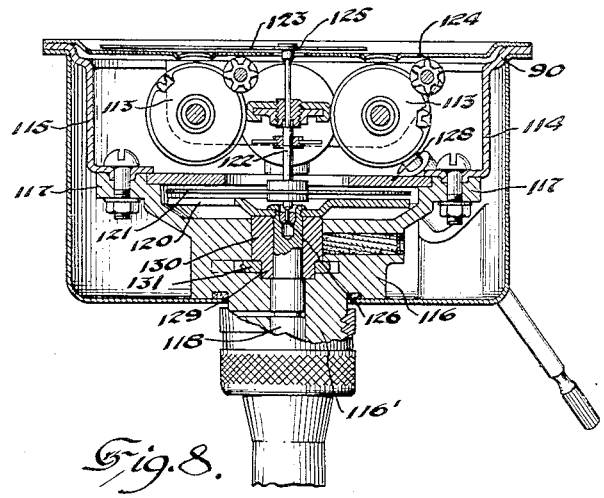
Figure 8 is a central sectional view of a modified form of pointer type speedometer, this speedometer using a mounting plate.
Figure 9:
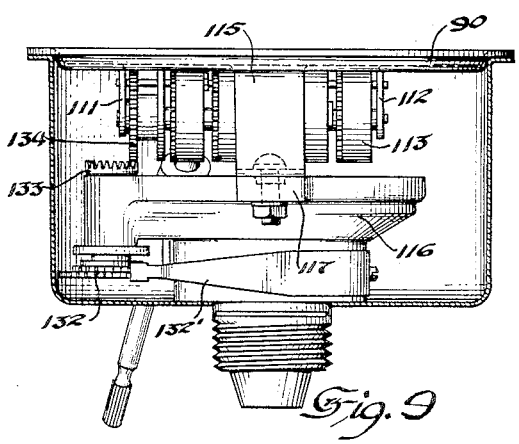
Figure 9 is a central sectional view showing parts in elevation, the view being of the side opposite to that shown by Figure 8.
Figure 10:
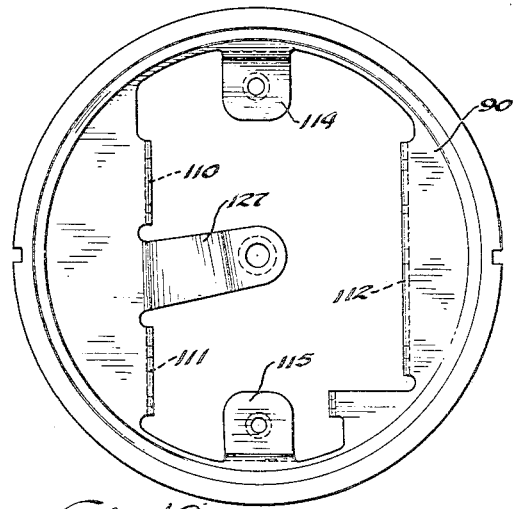
Figure 10 is a vertical front elevation of the mounting plate.

Numeral 56 represents an odometer frame, which frame is to be made as a stamping. It is cup-shaped and of non-magnetic material, such as brass. As shown in Figure 2, it is positioned above magnet 58 carried by the main frame. It is fastened to the main frame and held in assembly by the studs 14, already mentioned as the fastening means between the casing and the main frame. The cup-shaped frame 56 has a circular depression 60, which snugly fits a like-shaped bore 60' in the frame 10. It is on a ledge within said bore that the annular magnet 58 rests. This arrangement acts to exactly locate the frame 56. The peripheral wall 56' of frame 56 snugly fits within casing 12. There is thus provided a quick and easy means of locating the odometer frame relative to the main frame and also of locating the combined instrument in the casing 12. The bottom of frame 56 may have lanced out ears 62, as shown in Figures 2 and 5. These lanced out ears engage the magnet and when the frame 56 is secured to frame 10, these ears firmly clamp the magnet in position.

Figure 3:
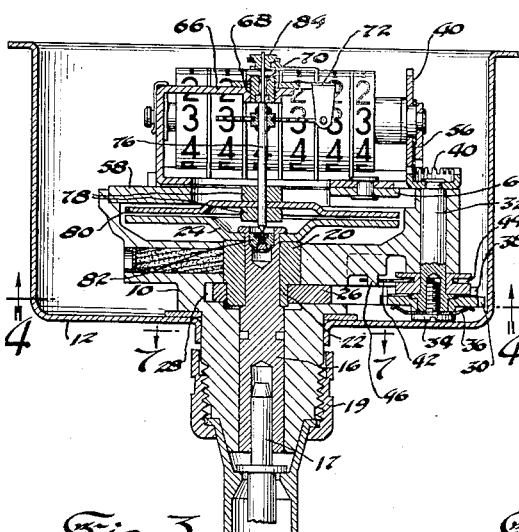
Figure 3 is a transverse section on line 3—3 of Figure 1.
Figure 4:
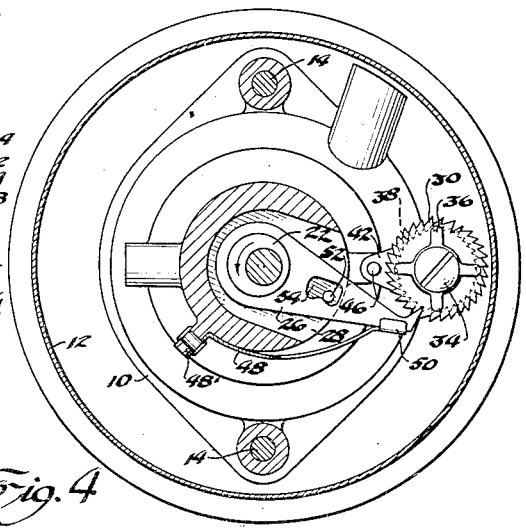
Figure 4 is a transverse section on line 4—4 of Figure 3.

Riveted to the under side of frame 56 is a temperature compensator 64, as shown in Figure 3. This compensator is intended to be received between the poles of the magnet and its function is to make corrections for errors in the reading of the needle due to changes in temperature. The magnet is accurately located in position in the act of assembling the frame member 56 since in so locating the frame 56, the compensator 64 is received between the poles of the magnet.

Frame 56 is further formed with an angularly turned arm 66 which projects over the center of the frame to serve as a supporting means for the spindle of the indicating pointer. This arm 66 is provided with screw threads, as at 68, to receive a jewel screw 70. Around the screw 70 is rotatably mounted a hair spring regulator 72. Ears 74 on regulator 72 are bent over arm 66, as shown in Figure 2, to retain the regulator 72 in position. In its rotating movement, the regulator is guided by member 70.

A spindle 76 carries a collar 73. The hair spring is connected at one end of this collar. Its other end is secured to an end of arm 72 in the usual manner. Pressed on spindle 76 are collars 78, between which is positioned disc 80 which is securely held to the spindle. The spindle 76 is centered in the axis of drive shaft 16 by means of a rotating cup 82 positioned in a bore at the upper end of shaft 16, and by means of the stationary jewel 70. Pressed on the end of spindle 76 is an indicating pointer bushing 84 to which the pointer 86 is secured as by riveting.

By the provisions described, there is provided a combined speedometer and odometer employing a very simple odometer supporting frame, this frame being formed as a stamping and all of its openings being punched, not drilled, as is the case when such a frame is made by casting. Reduced cost is thereby effected. The making of arm 66, serving as a jewel frame, an integral part of the odometer frame contributes to the simplicity and economy in manufacture.

The lining up and centering of the spindle by locating frame 56 directly in the die cast frame 10 through the provision of depression 60 snugly fitting opening 60' is of help in assembling the parts. Also, the use of studs 14 to hold the frames together and also to clamp the combined instruments in the casing contributes to the same result. The anchoring of the transfer pinion stamping in grooves 63 and 65 is a further simplification which can be readily used, thus avoiding the usual transfer pinion shafts supported by the odometer frame.

The mechanism, as a whole, is accurately and quickly assembled in the casing by the provision of the peripheral portion 56'. The casing flange 12' serving to hold the shaft retainer 18 in position represents another refinement in construction.

By the use of a speedometer of the pointer type, steady performance and uniformity in action are secured since a light weight disc with little inertia is used. Such a disc is exposed to a strong magnetic field of great uniformity owing to the use of the annular flat magnet.

The straight-away drive entering horizontally which this instrument employs affords a convenient means for the drive cable and for the coupling. This is also of importance in simplicity and low cost.

A pointer type speedometer also affords a means for matching a clock with a speedometer in the panel.

The construction is also designed to use parts which are also used in the manufacture of a standard tachometer, these parts being the rotor, the magnet, the disc, the spindle, the pointer, the hair spring and the bearings. The drive shaft 16 is a slight modification of the corresponding shaft of the tachometer, being somewhat longer to accommodate the bushing carrying the eccentric pin 22. The main supporting frame must also be somewhat changed to accommodate the ratchet drive for the odometer.

Figure 11:
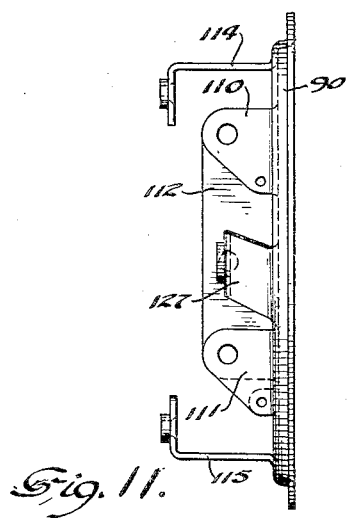
Figure 11 is a vertical side elevation of the same.

Figures 8 to 11 illustrate a somewhat modified form of the invention. This form also makes use of a pointer type of speedometer. This form is provided with a mounting plate 90 similar to that used in well-known speedometers for mounting the frame of the speedometer in the casing. It has ears 110, 111 and 112. Between these ears are journaled the figure wheels 113. Backwardly projecting lugs 114 and 115 are provided to act as spacers and to mount this mounting plate on the die cast frame 116. These lugs 114 and 115 are bolted to ears 117 on the frame 116, as shown in Figure 11. The same fastening means also serves to clamp magnet 128 in place, as illustrated in Figure 11.

The frame 116 supports the driving mechanism composed of driven shaft 118 journaled in the shank 116' of frame 116 and to this shaft is fixed rotor 120. Numeral 121 represents a disc carrying the spindle 122 and pointer 123. Pointer 123 rotates over a conventional dial 124. Spindle 122 is centered at 125 and 126 in suitable bearings in the end of an arm 127 stamped from plate 90 and in the end of the rotor shaft. The magnet 128 is positioned on the frame substantially as in the previous form. The double reduction gearing consists of an eccentric 129 on bushing 130 carried by rotor shaft 118. On this bushing is journaled a pawl 131, which latter is urged into engagement with ratchet wheels 132 by a spring clip 132'. Gear 133 driven in this way meshes with an intermediate gear 134, itself driving the trip and season wheels 113 in a manner which will be obvious from the description of the form first described.

This form of the invention differs from the form first described by the use of a mounting plate 90. The mechanism is thereby simplified, particularly the die cast frame.

I claim:

1. In a measuring instrument, a main frame, a magnet supported by said frame, a supplementary frame, a thermostatic compensator adapted to be received between the poles of said magnet and secured to said second frame, means to secure said second frame to said first frame in a predetermined position whereby said compensator locates said magnet in a predetermined position on said main frame.

2. The invention defined by claim 1, said second frame having resilient tongue means to engage and hold said magnet on said first frame when the two frames are secured together.

RALPH O. HELGEBY.